(12) United States Patent
Day (10) Patent No.: US 8,839,186 B2
(45) Date of Patent: Sep. 16, 2014

(54) ENTITY MORPHING IN METAMODEL-BASED TOOLS

(75) Inventor: Rouven Day, Poststraβe (DE)

(73) Assignee: SAP AG, Walldorf (DE)

(*) Notice: Subject to any disclaimer, the term of this patent is extended or adjusted under 35 U.S.C. 154(b) by 517 days.

(21) Appl. No.: 12/613,351

(22) Filed: Nov. 5, 2009

(65) Prior Publication Data

US 2011/0106724 A1    May 5, 2011

(51) Int. Cl.
*G06F 9/44* (2006.01)
*G06Q 10/06* (2012.01)

(52) U.S. Cl.
CPC ............. *G06F 8/10* (2013.01); *G06Q 10/067* (2013.01)
USPC ......................................................... 717/104

(58) Field of Classification Search
USPC .......................................... 705/348; 717/104
See application file for complete search history.

(56) References Cited

U.S. PATENT DOCUMENTS

| 6,044,380 | A | * | 3/2000 | Gerard et al. ................. 1/1 |
| 6,192,371 | B1 | * | 2/2001 | Schultz .......................... 1/1 |
| 8,046,735 | B1 | * | 10/2011 | Singh et al. ................ 717/105 |
| 2006/0293941 | A1 | | 12/2006 | Ivanov et al. |
| 2010/0013842 | A1 | * | 1/2010 | Green et al. ................. 345/522 |

OTHER PUBLICATIONS

EPO Communication dated Oct. 19, 2012 for EP patent application No. 10013724.9.

* cited by examiner

*Primary Examiner* — Philip Wang
(74) *Attorney, Agent, or Firm* — Mintz Levin Cohn Ferris Glovsky and Popeo, P.C.

(57) ABSTRACT

A system and method for morphing entities in metamodel-based business process model and notation (BPMN) tools is disclosed. A command is received for an entity to be morphed from a first non-abstract entity type to a second non-abstract entity type. A modeling infrastructure (MOIN) returns all non-abstract sub-types or siblings of the entity based on an inheritance hierarchy in a metamodel associated with the entity. The second non-abstract entity type is determined from the non-abstract sub-types or siblings of the entity, and the selected entity is morphed from the first non-abstract entity type to the second non-abstract entity type.

18 Claims, 6 Drawing Sheets

ENTITY MORPHING IN METAMODEL-BASED TOOLS

BACKGROUND

This disclosure relates generally to model-driven process development, and more particularly to a system and method for refining model entities based on a metamodel definition.

Business Process Management (BPM) tools allow users to model, execute, and monitor your business processes based on a common process model. Business Process Model and Notation (BPMN) is an industry standard graphic notation for representing business process workflows. BPMN shows the end-to-end flow of a business process in a flowchart-type style, and is often used with a user-interface-oriented BPMN tool. One example of a BPMN tool is SAP's NetWeaver BPM component (NW BPM, also referred to as "Galaxy"), which is designed to help users improve the efficiency of business processes, reduce errors in complex repetitive tasks, and lower exception-handling costs. With SAP BPM, users can compose process steps, define business rules and exceptions, model process flows using BPMN, execute process models efficiently, and support interaction with running processes via personalized user interfaces or interactive forms.

In such model-driven development, a metamodel is a model that describes how models can be constructed. In the metamodel, classes can be specified which represent domain entities and define their relationships. These entities and their relationships also contain information for tools built on top of this metamodel, such as a BPMN tool, for example. However, this information currently does not provide any functionality in the modeling infrastructure that rapidly adjusts diagram elements based on a given metamodel definition.

SUMMARY

In general, this document discusses a system and method for using an inheritance hierarchy in a metamodel as a manual for a tool on how to refine model entities based on the metamodel definition. This information provides a generic functionality in the modeling infrastructure that rapidly adjusts diagram elements (e.g. of a BPMN tool) based on a given metamodel definition.

In one aspect, a computer-implemented method for morphing entities in metamodel-based business process model and notation (BPMN) tools. The method is performed by execution of computer readable program code by at least one processor of at least one computer system. In another aspect, the method is implemented by a system that includes a storage device and a BPMN tool computer in communication with the storage device.

The method includes receiving a command for an entity to be morphed from a first non-abstract entity type to a second non-abstract entity type, and returning, from a modeling infrastructure (MOIN), all non-abstract sub-types or siblings of the entity based on an inheritance hierarchy in a metamodel associated with the entity. The method further includes determining the second non-abstract entity type from the non-abstract sub-types or siblings of the entity, and morphing the selected entity from the first non-abstract entity type to the second non-abstract entity type.

In yet another aspect, a computer program product for morphing entities in metamodel-based business process model and notation (BPMN) tools is presented. The product comprises a storage medium readable by at least one processor and storing instructions for execution by the at least one processor for receiving a command for an entity to be morphed from a first non-abstract entity type to a second non-abstract entity type, and returning all non-abstract sub-types or siblings of the entity based on an inheritance hierarchy in a metamodel associated with the entity. The instructions further include determining the second non-abstract entity type from the non-abstract sub-types or siblings of the entity, and morphing the selected entity from the first non-abstract entity type to the second non-abstract entity type.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

This document describes a system and method for entity morphing in metamodel-based tools. In particular, the system includes functionality in the modeling infrastructure that rapidly adjusts diagram elements based on a given metamodel definition. In accordance with some implementations, a functional module is configured to "morph" entities of a model based on a given metamodel definition, and can be exposed as a generic command in a modeling infrastructure (MOIN) used by a BPMN tool. The MOIN enables model-driven development, meaning that things that are modeled by a user, such as BPMN artifacts for example, are stored in the form of models inside the MOIN based on given metamodels.

The term "morphing" as used herein has several meanings, such as, for example, changing to a more concrete type, or changing to a sibling while keeping existing attribute values, relationships and identity wherever possible. Morphing can be done over one level in the inheritance hierarchy, or over multiple levels. In more sophisticated cases, morphing can also mean that a tool can morph on the same level of the hierarchy from sibling to sibling.

In exemplary implementations, morphing is associated with a migrate command, such as a "MigrateToSubType-Command" in the MOIN used in SAP's Netweaver BPM to migrate to a sub-type. Such a command gets two parameters: 1) the element that will be migrated; and 2) the class descriptor of the sub-type to which the element will be migrated. In some implementations, an application programming interface (API) provides a set of sub-types that are applicable for morphing of a given element based on an inheritance hierarchy in the metamodel. On execution, the migration command migrates the given model element to one of its non-abstract sub-types (or sibling), and takes over all attribute values and relationships wherever possible.

Figure 1:
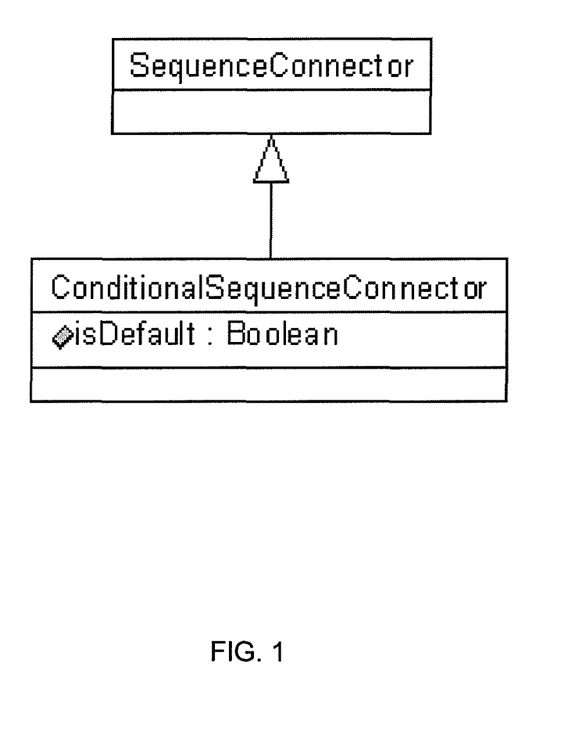
FIG. 1 illustrates morphing a Sequence Connector to a Conditional Sequence Connector.

Once it is decided, either by the user or a program, to morph a model element to one of its non-abstract sub-types—such as morphing a Sequence Connector to a Conditional Sequence Connector as shown in the example of FIG. 1—the migration command can be executed by code. The following code in the bpem.ide (integrated development environment) plug-in of a developer studio is one example of a migration command that can be called. As an example, the plug-in contains the following code snippet which uses the "MigrateToSubTypeCommand" API:

```
<...>
    Command comm = new MigrateToSubTypeCommand(
        getConnection( ),
        GlxIdeMessages.ConvertAbstract2BPMNType_0,
        seqConn,
        ConditionalSequenceConnector.CLASS_DESCRIPTOR);
    comm.execute( );
    RefObject element =
    ((MigrateToSubTypeCommand)comm).getMigratedElement( );
    if(element instanceof ConditionalSequenceConnector){
        csc = (ConditionalSequenceConnector)element;
<...>
```

Figure 2:
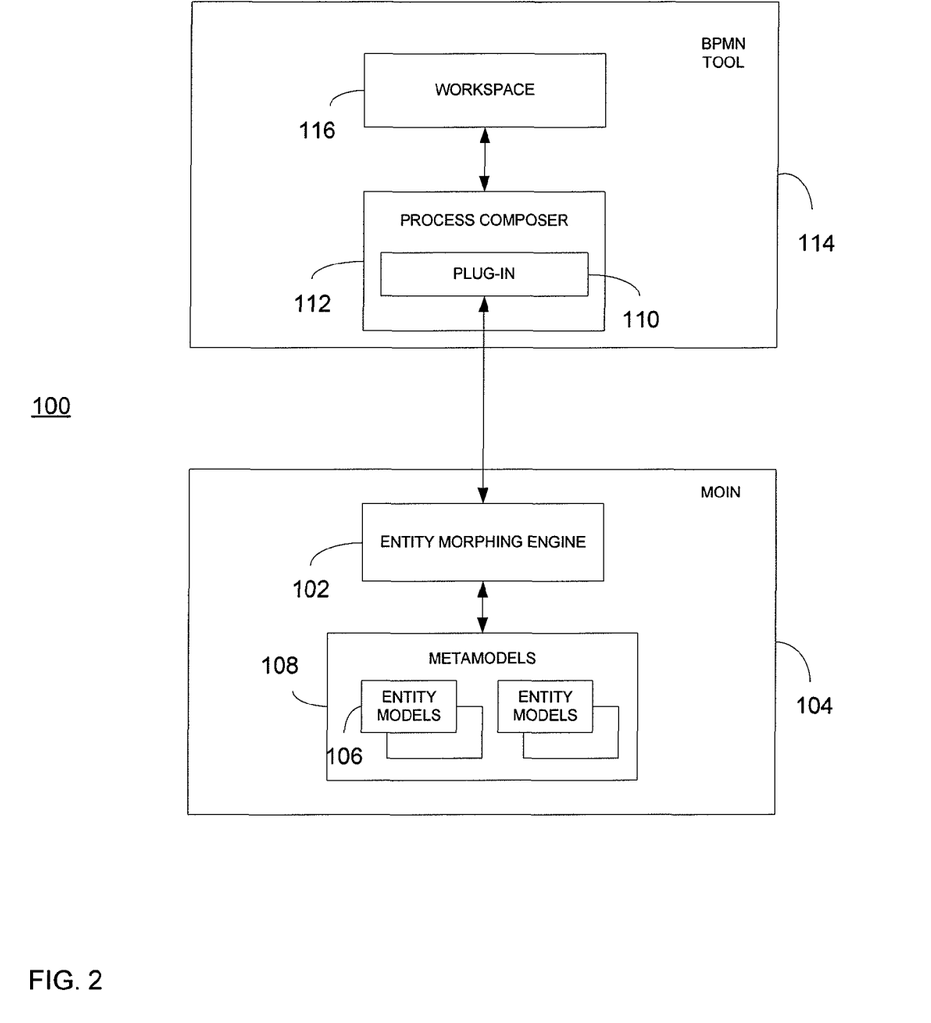
FIG. 2 shows an entity morphing system.

As illustrated in FIG. 2, which shows an entity morphing system 100, the plug-in 110 can be part of a process composer 112 of a BPMN tool 114 which generates a workspace 116 for a user. The process composer 112 is an application and computer program product, and can be run on a server computer and served to a client computer through a network, while the workspace 116 is run on one or more client computers.

Figure 6:
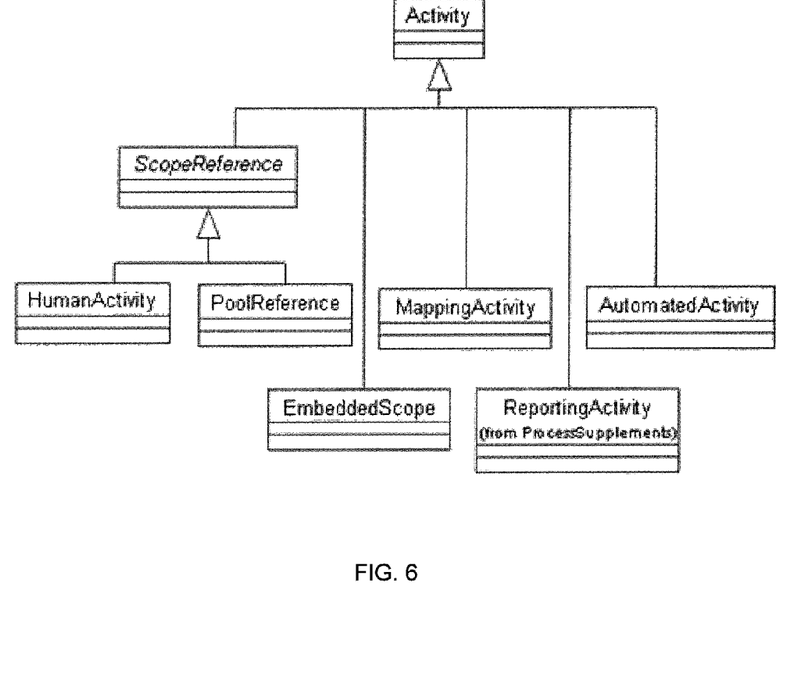
FIG. 6 illustrates one example of a metamodel.

Entity morphing is performed by an entity morphing engine 102 in the MOIN 104, and in some implementations the entity morphing engine is implemented as Java code. In such implementations, the Java code is configured to run inside an ECLIPSE platform. The MOIN 104 allows model driven development, meaning that the things (e.g. BPMN artifacts) that are modeled by a user are stored in form of entity models 106 inside the MOIN 104 according to given metamodels 108. One example of a metamodel is shown in FIG. 6.

Figure 3:
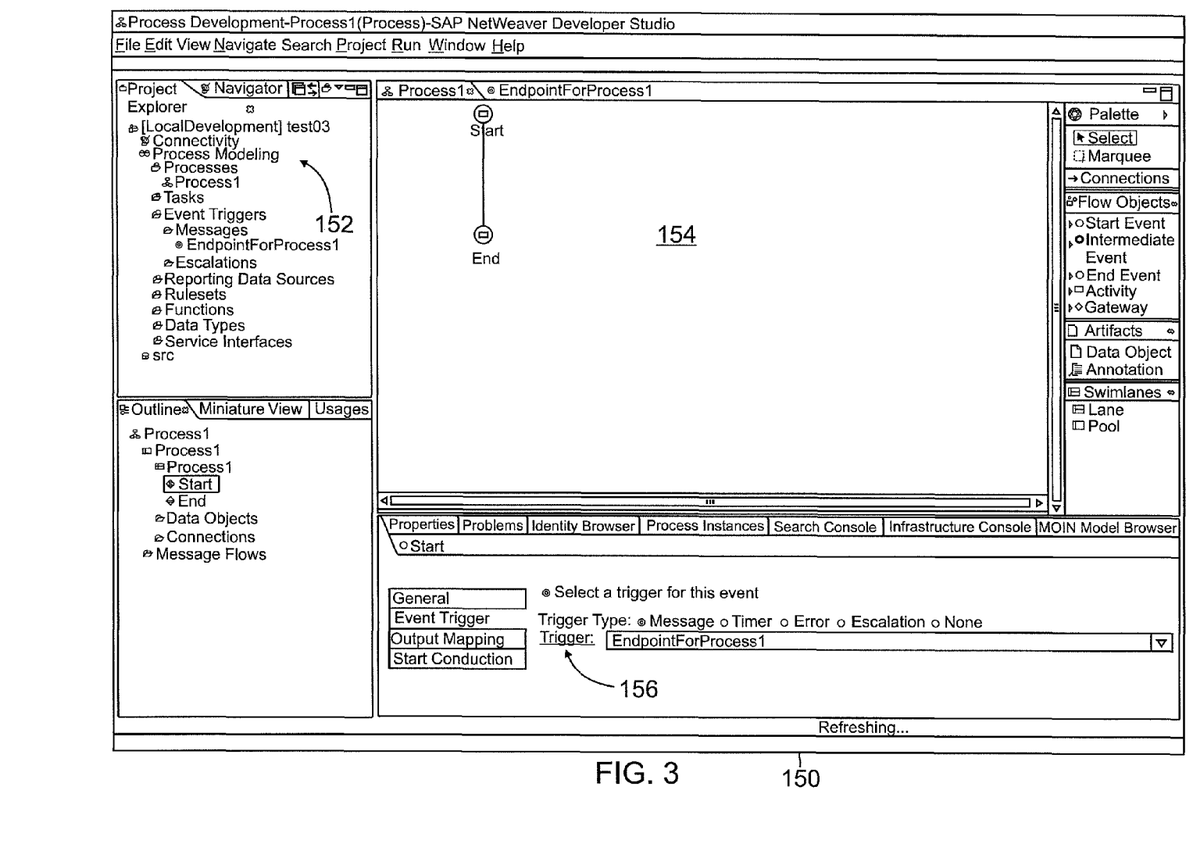
FIG. 3 depicts a user interface through which an entity morphing technique can be executed.
Figure 4:
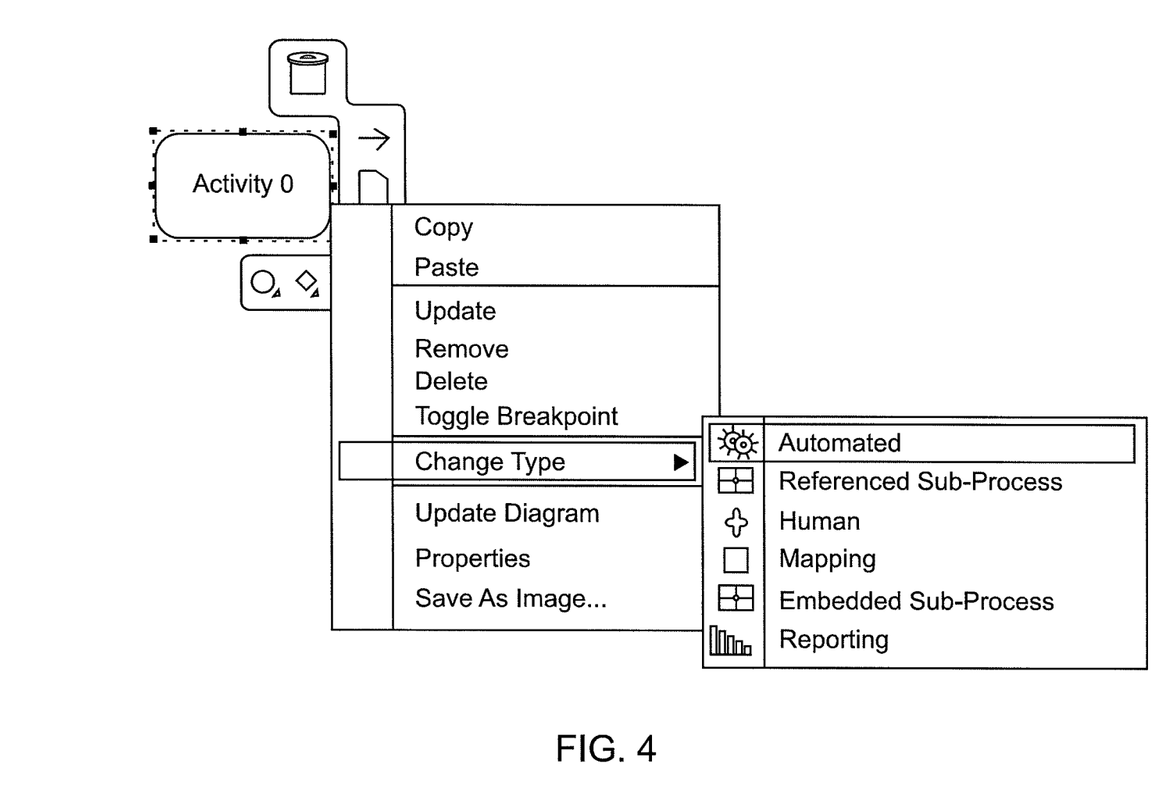
FIG. 4 shows a sub-menu for executing the entity morphing process.

The process composer 112 and workspace 116 may also provide a user interface that depicts a graphical notation of BPMN processes and entities, among other information. FIG. 3 shows an exemplary user interface 150 of a BPMN tool provided by a process composer. In addition to a set of function controls and menus, the user interface includes a folder tree 152 with a number of folders to indicate modeled processes and message triggers that can be used to trigger a process. The processes can be defined, modeled and generated in a graphical modeling window 154 of the user interface 150, using the graphic notation and flowcharting techniques of BPMN to represent domain entities and their relationships according to a metamodel. The user interface 150 can also include a properties definition area 156 in which users can define properties of processes, entities, and relationships. FIG. 4 represents a sub-menu for executing the entity morphing process.

Figure 5:
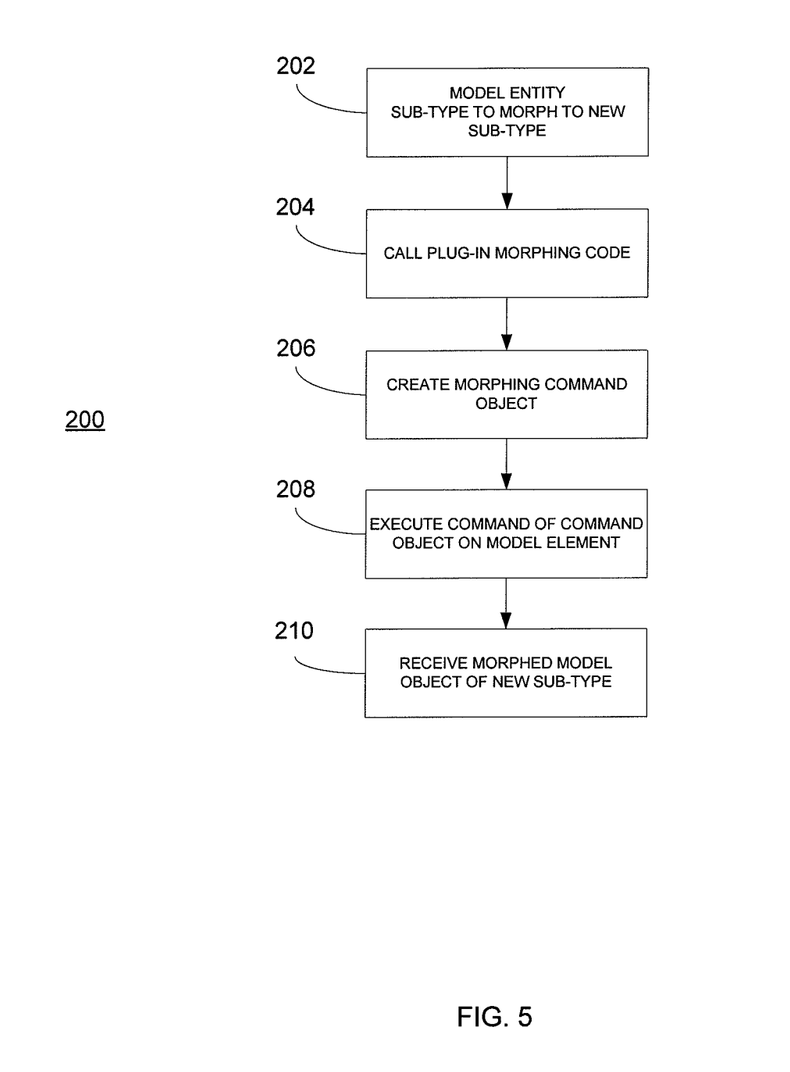
FIG. 5 is a flowchart of an entity morphing method.

FIG. 5 is a flowchart of an entity morphing method 200. At 202, sub-type of a model element is selected for being morphed into a new sub-type. The selection can occur by a user operating the user interface and selecting a graphical representation of the model element to be morphed. Based on the selection, at 204, a morphing code plug-in in the process composer is called by the entity morphing engine. The call can be based on a user command that is processed by the entity morphing engine to execute the morphing code plug-in. At 206, the morphing code plug-in creates a morphing command object, which implements a constructor of the morphing command object.

In some entity morphing process implementations, first a new "MigrateToSubTypeCommand" is created via the constructor. A command is a wrapper for MOIN functionality that is used to operate on MOIN entity models. The constructor needs a connection to the MOIN that is used to execute the command, and which provides a human readable description of the command, the element that shall be migrated, and the ClassDescriptor of the sub-type. At 208, after the Command object has been created, the command is executed via calling the execute( )method. For example, as a result, the "getMigratedElement( )" can be called on the command object, and at 210 the migrated element is received that can be cast to its new sub-type and used further.

In an alternative implementation, the MOIN can be configured to provide all non-abstract sub-types for a given model element based on the metamodel. This list can then be visualized, i.e. represented visually in a graphical display, to an end user who can then decide to which of the given sub-types the model element should be morphed. This code is executed before the "MigrateToSubTypeCommand" is constructed.

Some or all of the functional operations described in this specification can be implemented in digital electronic circuitry, or in computer software, firmware, or hardware, including the structures disclosed in this specification and their structural equivalents, or in combinations of them. Embodiments of the invention can be implemented as one or more computer program products, i.e., one or more modules of computer program instructions encoded on a computer readable medium, e.g., a machine readable storage device, a machine readable storage medium, a memory device, or a machine-readable propagated signal, for execution by, or to control the operation of, data processing apparatus.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of them. A propagated signal is an artificially generated signal, e.g., a machine-generated electrical, optical, or electromagnetic signal, that is generated to encode information for transmission to suitable receiver apparatus.

A computer program (also referred to as a program, software, an application, a software application, a script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to, a communication interface to receive data from or transfer data to, or both, one or more mass storage devices for storing data, e.g., magnetic, magneto optical disks, or optical disks.

Moreover, a computer can be embedded in another device, e.g., a mobile telephone, a personal digital assistant (PDA), a mobile audio player, a Global Positioning System (GPS) receiver, to name just a few. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Certain features which, for clarity, are described in this specification in the context of separate embodiments, may also be provided in combination in a single embodiment. Conversely, various features which, for brevity, are described in the context of a single embodiment, may also be provided in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Particular embodiments of the invention have been described. Other embodiments are within the scope of the following claims. For example, the steps recited in the claims can be performed in a different order and still achieve desirable results. In addition, embodiments of the invention are not limited to database architectures that are relational; for example, the invention can be implemented to provide indexing and archiving methods and systems for databases built on models other than the relational model, e.g., navigational databases or object oriented databases, and for databases having records with complex attribute structures, e.g., object oriented programming objects or markup language documents. The processes described may be implemented by applications specifically performing archiving and retrieval functions or embedded within other applications.

What is claimed is:

1. A computer-implemented method for morphing entities in metamodel-based business process model and notation (BPMN) tools, the method being performed by execution of computer readable program code by at least one processor of at least one computer system, the method comprising:
   receiving, by a client having one or more processors, a command for an entity to be morphed from a first non-abstract entity type to a second non-abstract entity type;
   returning, by the client and from a modeling infrastructure (MOIN), one or more applicable non-abstract sub-types of the first non-abstract entity type or siblings of the entity based on an inheritance hierarchy in a metamodel associated with the entity, the metamodel including classes that characterize domain entities and relationships between the domain entities, the domain entities including the entity being morphed;
   determining, by a morphing engine being executed by the one or more processors remote from the client, the second non-abstract entity type from the one or more applicable non-abstract sub-types or siblings of the entity, the determining including calling a morphing code in a process composer plug-in being executed at the client, the morphing code creating a morphing command object via a constructor that gets, from the MOIN, a connection to the MOIN, a human readable description of the morphing command, the element to be migrated, and the class descriptor of the sub-type to which the element is to be morphed; and
   morphing, by the morphing engine being executed on the one or more processors, the entity from the first non-abstract entity type to the second non-abstract entity type.

2. The method in accordance with claim 1, further comprising:
   providing, by the one or more processors, a human readable description of the command for a user interface.

3. The method in accordance with claim 1, wherein the command includes a wrapper for a MOIN functionality that is used to operate on the entity to be morphed.

4. The method in accordance with claim 1, wherein the constructor further includes a class descriptor of the second non-abstract entity sub-type.

5. The method in accordance with claim 1, wherein the morphing code plug-in generates a representation of the entity to be morphed as the second non-abstract entity type.

6. The method of claim 1, wherein properties of the domain entities and the relationships are defined on a graphical user interface displayed to a user.

7. The method of claim 6, wherein the properties include a selected trigger type, the selected trigger type being one of a message, a timer, an error, and an escalation.

8. A non-transitory computer program product for morphing entities in metamodel-based business process model and notation (BPMN) tools, the product storing instructions for execution by at least one processor for:
   receiving a command for an entity to be morphed from a first non-abstract entity type to a second non-abstract entity type;
   returning one or more applicable non-abstract sub-types of the first non-abstract entity type based on an inheritance hierarchy in a metamodel associated with the entity, the metamodel including classes that characterize domain entities and relationships between the domain entities, the domain entities including the entity being morphed;
   determining, by a morphing engine, the second non-abstract entity type from the one or more applicable non-abstract sub-types, the determining including calling a morphing code in a process composer plug-in being executed by at least one data processor remote from the morphing engine, the morphing code creating a morphing command object via a constructor that gets, from the MOIN, a connection to the MOIN, a human readable description of the morphing command, the element to be migrated, and the class descriptor of the sub-type to which the element is to be morphed; and
   morphing, by a morphing engine, the entity from the first non-abstract entity type to the determined second non-abstract entity type.

9. The method in accordance with claim 8, the instructions further include instructions for:
   providing a human readable description of the command for a user interface.

10. The method in accordance with claim 8, wherein the command includes a wrapper for a MOIN functionality that is used to operate on the entity to be morphed.

11. The method in accordance with claim 8, wherein the constructor further includes a class descriptor of the second non-abstract entity sub-type.

12. The method in accordance with claim 8, wherein the morphing code plug-in generates a representation of the entity to be morphed as the second non-abstract entity type.

13. A system for morphing entities in metamodel-based business process model and notation (BPMN) tools, the system comprising:
   a storage device; and
   a BPMN tool computer in communication with the storage device, the BPMN tool computer including software to implement a method comprising:
      receiving a command for an entity to be morphed from a first non-abstract entity type to a second non-abstract entity type, the second non-abstract entity type being a sub-type of the first non-abstract entity type;
      returning, from a modeling infrastructure (MOIN) to the BPMN tool computer, all non-abstract sub-types or siblings of the entity based on an inheritance hierarchy in a metamodel associated with the entity, the metamodel including classes that characterize domain entities and relationships between the domain entities, the domain entities including the entity being morphed;
      determining, by a morphing engine, the second non-abstract entity type from the non-abstract sub-types or siblings of the entity, the determining including calling a morphing code in a process composer plug-in being executed by at least one data processor remote from the morphing engine, the morphing code creating a morphing command object via a constructor that gets, from the MOIN, a connection to the MOIN, a human readable description of the morphing command, the element to be migrated, and the class descriptor of the sub-type to which the element is to be morphed; and
      morphing, by the morphing engine, the entity from the first non-abstract entity type to the second non-abstract entity type.

14. The system in accordance with claim 13, wherein the method further includes:
   providing a human readable description of the command for a user interface.

15. The system in accordance with claim 13, wherein the command includes a wrapper for a MOIN functionality that is used to operate on the entity to be morphed.

16. The system in accordance with claim 13, wherein the constructor further includes a class descriptor of the second non-abstract entity sub-type.

17. The system in accordance with claim 13, wherein the morphing code plug-in generates a representation of the entity to be morphed as the second non-abstract entity type.

18. The system of claim 13, wherein the first non-abstract entity type is a sequence connector, the second non-abstract entity type being a conditional sequence connector, the sequence connector and the conditional sequence connector being graphical elements characterizing corresponding connections in a graphically displayed business process.

* * * * *